United States Patent
Amano

(10) Patent No.: US 12,229,348 B2
(45) Date of Patent: Feb. 18, 2025

(54) FLEXIBLE OPTICAL FINGER TRACKING SENSOR SYSTEM

(71) Applicant: Konica Minolta Business Solutions U.S.A., Inc., San Mateo, CA (US)

(72) Inventor: Jun Amano, Hillsborough, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 239 days.

(21) Appl. No.: 18/091,463

(22) Filed: Dec. 30, 2022

(65) Prior Publication Data

US 2024/0220032 A1 Jul. 4, 2024

(51) Int. Cl.
*G06F 3/03* (2006.01)
*G06F 3/01* (2006.01)
*G06N 3/091* (2023.01)

(52) U.S. Cl.
CPC ............ *G06F 3/0304* (2013.01); *G06F 3/014* (2013.01); *G06N 3/091* (2023.01)

(58) Field of Classification Search
CPC .......... G06F 3/017; G06F 3/011; G06F 3/014; G06F 3/013; G06F 3/012; G06F 3/0304; G06F 3/14; G06F 3/147; G06F 18/00; G06F 3/0416; G06F 1/163; G06F 3/04883; G06F 3/042; G06F 3/0421; G06F 3/04886; G06F 21/32; G06F 3/016; G06F 3/0346; G06F 3/0425; G06F 3/0443; G06F 3/0446; G06F 1/1694; G06F 2203/0331; G06F 3/015; G06F 3/0312; G06F 3/0412;

(Continued)

(56) References Cited

U.S. PATENT DOCUMENTS 5,184,009 A * 2/1993 Wright .................... G06F 3/014
  250/221
9,939,899 B2   4/2018 Allec et al.
(Continued)

FOREIGN PATENT DOCUMENTS

CN   109069011 A  * 12/2018  ........... A61B 5/0059
CN   118155238 A  *  6/2024  ............... G06T 7/75
(Continued)

OTHER PUBLICATIONS

Murawski et al., "Emerging Biomedical Applications of Organic Light-Emitting Diodes"; Advanced Optical Materials, vol. 9, Issue 14; Published May 17, 2021 (59 pages).

*Primary Examiner* — Michael P Stafira
(74) *Attorney, Agent, or Firm* — Osha Bergman Watanabe & Burton LLP

(57) ABSTRACT

A system, for tracking fingers of a hand, includes: a sensor patch and a processor. The sensor patch includes: a flexible substrate layer; a light emitting layer attached to the flexible substrate layer; and a photodiode disposed between the light emitting layer a surface of the sensor patch that contacts the hand. The light emitting layer is configured to conform to a skin surface of a backside of the hand and to emit a first wavelength of light. The processor is configured to: control emission of the first wavelength of light by the light emitting layer; analyze backscattered light intensities from the skin surface of the backside of the hand that are detected by the photodiode; determine finger pose information based on the backscattered light intensities; and transmit the finger pose information.

20 Claims, 8 Drawing Sheets

(58) Field of Classification Search
CPC ......... G06F 3/0482; G06F 2203/04105; G06F 3/0308; G06F 21/31; G06F 2203/04102; G06F 2203/04103; G06F 2203/04107; G06F 2203/04112; G06F 3/0338; G06F 3/045; G06F 3/046; G06F 3/04815; G06F 3/04817; G06F 3/04845; G06F 3/1423; G06F 2203/0339; G06F 3/0219; G06F 3/03547; G06F 3/0362; G06F 3/0488; G06F 1/1637; G06F 1/169; G06F 21/10; G06F 21/1014; G06F 2203/04108; G06F 2203/04809; G06F 2218/00; G06F 3/0233; G06F 3/03545; G06F 3/04847; G06F 16/9537; G06F 2203/0381; G06F 3/005; G06F 3/038; G06F 3/0423; G06F 3/00; G06F 3/0325; G06F 1/1686; G06F 1/3215; G06F 1/3278; G06F 1/3287; G06F 18/10; G06F 21/83; G06F 2203/0335; G06F 2218/04; G06F 3/02; G06F 3/033; G06F 3/041; G06F 3/044; G06N 20/00; G06N 3/045; G06N 3/084; G06N 3/047; G06N 20/10; G06N 20/20; G06N 3/0464; G06N 3/088; G06N 3/091; G06N 5/025; G06N 5/046; G06N 7/01; G02B 6/0011; G02B 6/2706; G02B 2027/0187; G02B 27/017; G02B 27/0093; G02B 27/0172; G02B 2027/0138; G02B 2027/014; G02B 2027/0178; G02B 30/52; G02B 2027/0134; G02B 21/16; G02B 21/365; G02B 2207/113; G02B 6/0036; G02B 6/0093; G02B 6/0035; G02B 2027/0127; G02B 27/48; G02B 21/0012; G02B 3/0087; G01B 9/02091; G01B 9/02087; G01B 9/02008

See application file for complete search history.

(56) References Cited

U.S. PATENT DOCUMENTS

| | | | |
|---|---|---|---|
| 12,093,460 B2* | 9/2024 | Yetkin | G06F 3/015 |
| 2014/0098018 A1* | 4/2014 | Kim | G06F 3/014 |
| | | | 345/156 |
| 2015/0309535 A1* | 10/2015 | Connor | A61B 5/1477 |
| | | | 361/679.03 |
| 2017/0205785 A1* | 7/2017 | Almadani | G05B 15/02 |
| 2021/0181855 A1* | 6/2021 | Yetkin | A61F 2/68 |

FOREIGN PATENT DOCUMENTS

| | | | | |
|---|---|---|---|---|
| WO | WO-2008010024 A1 * | 1/2008 | | G06F 3/014 |
| WO | WO-2015121100 A1 * | 8/2015 | | G06F 3/011 |
| WO | WO-2019156518 A1 * | 8/2019 | | G02B 27/017 |
| WO | WO-2024049740 A2 * | 3/2024 | | |

* cited by examiner

FLEXIBLE OPTICAL FINGER TRACKING SENSOR SYSTEM

BACKGROUND

Wearable flexible sensor technology has become a key technology in health monitoring, vital sign sensing, physical activity tracking, posture/movement monitoring, and entertainment applications. For example, augmented reality (AR) and virtual reality (VR) allow a user to view and/or interact with computer-generated objects and environments in a wide variety of applications (e.g., training simulations, video games). Realistic interactions with objects in AR/VR environments are often limited by the computer system's ability to accurately recreate the presence of a user's hands and fingers in the AR/VR environment. Compared to a simulation of a generic hand pose (e.g., open palm, closed fist, index finger pointing pose), the realism of the AR/VR environment can be improved by tracking the user's individual fingers to generate an accurate, real-time representation of the fingers and to simulate collision detections more accurately. For example, with accurate finger tracking, a user can grip a virtual object with a specific finger configuration rather than snapping the virtual object to a predetermined grip configuration.

SUMMARY

In general, one or more embodiments of the invention relate to a system for tracking fingers of a hand. The system comprises: a sensor patch and a processor. The sensor patch comprises: a flexible substrate layer; a light emitting layer attached to the flexible substrate layer, wherein the light emitting layer is configured to conform to a skin surface of a backside of the hand and to emit a first wavelength of light; and a photodiode disposed between the light emitting layer and a surface of the sensor patch that contacts the hand. The processor is configured to: control emission of the first wavelength of light by the light emitting layer; analyze backscattered light intensities from the skin surface of the backside of the hand that are detected by the photodiode; determine finger pose information based on the backscattered light intensities; and transmit the finger pose information.

In general, one or more embodiments of the invention relate to a method for tracking fingers of a hand. The method comprises: attaching a sensor patch to a skin surface of a backside of the hand, wherein the sensor patch includes a flexible substrate layer, a light emitting layer attached to the flexible substrate layer, and a photodiode disposed between the light emitting layer and a surface of the sensor patch that contacts the hand, and the light emitting layer conforms to the backside of the hand; emitting, by the light emitting layer, a first wavelength of light into the hand; detecting backscattered light intensities from the skin surface of the backside of the hand with the photodiode; analyzing, by a processor that is coupled to the light emitting layer and the photodiode, the backscattered light intensities from the skin surface of the backside of the hand; determining, by the processor, finger pose information based on the backscattered light intensities; and transmitting the finger pose information.

In general, one or more embodiments of the invention relates to a non-transitory computer readable medium (CRM) storing computer readable program code for tracking fingers of a hand. The computer readable program code causes a processor to: control emission of a first wavelength of light into the hand by a sensor patch attached to a skin surface of a backside of the hand, wherein the sensor patch includes a flexible substrate layer, a light emitting layer attached to the flexible substrate layer, and a photodiode disposed between the light emitting layer and a surface of the sensor patch that contacts the hand, and the light emitting layer conforms to the backside of the hand; detect backscattered light intensities from the skin surface of the backside of the hand with the photodiode; analyze the backscattered light intensities from the skin surface of the backside of the hand; determine finger pose information based on the backscattered light intensities; and transmit the finger pose information.

Other aspects of the invention will be apparent from the following description and the appended claims.

DETAILED DESCRIPTION

Figure 1A:
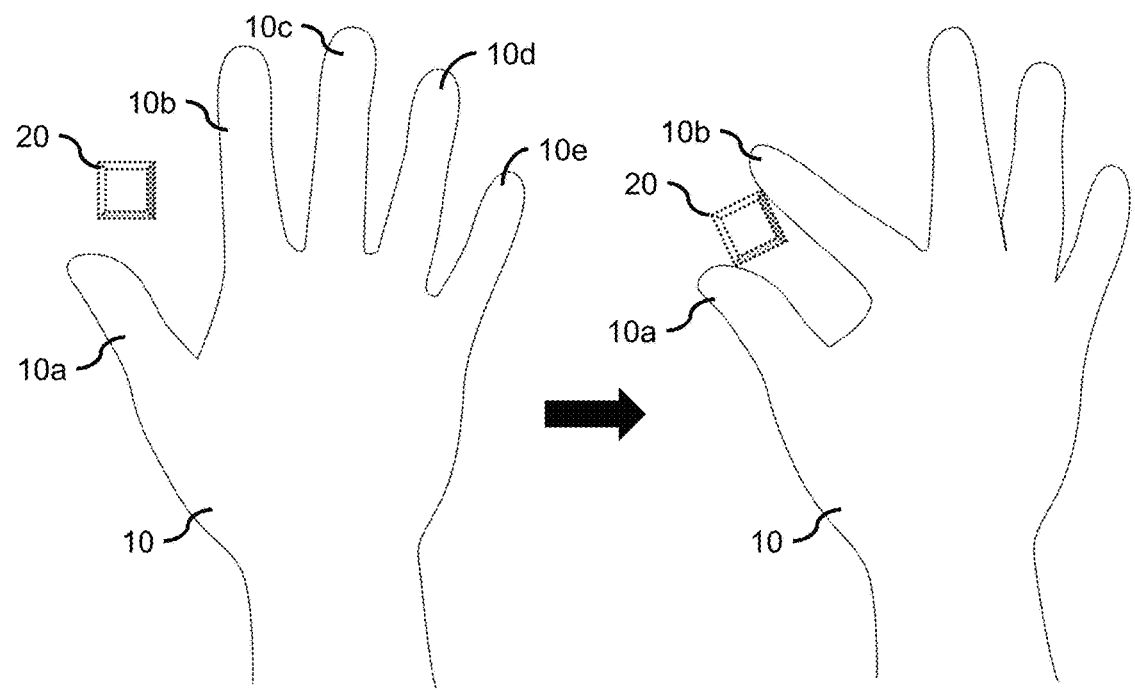
FIGS. 1A-1B show a hand demonstrating a finger pose and a configuration of bones in the hand.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before." "after," "single." and other such terminology. Rather the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a non-transitory computer readable medium (CRM) for tracking fingers of a hand. More specifically, one or more embodiments of the invention are directed to a wearable sensor patch and processor that determine finger pose information by illuminating the backside of a user's hand and tracking the metacarpal bones based on the backscattered light from the skin surface of the backside of the hand. Because the metacarpal bones are connected the fingers by a complex array of musculature and located closely to the skin of the backside of the hand, it is possible to extrapolate finger pose information for the fingers based on the relative movement and deflection of the metacarpals. The finger pose information may then be transmitted from the finger tracking system to another device as input information (e.g., for a virtual model of the user's hands). In one or more embodiments, finger pose information may include a position and/or orientation of one or more fingers of the hand. In one or more embodiments, finger pose information may include a position and/or orientation for individual bones of the hand. In one or more embodiments, finger pose information may include a position and/or orientation estimate for the entire hand (e.g., a gesture or activity classification). It will be appreciated that any combination of hand, finger, bone and/or classification information may be included in the finger pose information, and the disclosure is not particularly limited to the above configurations.

Figure 1B:
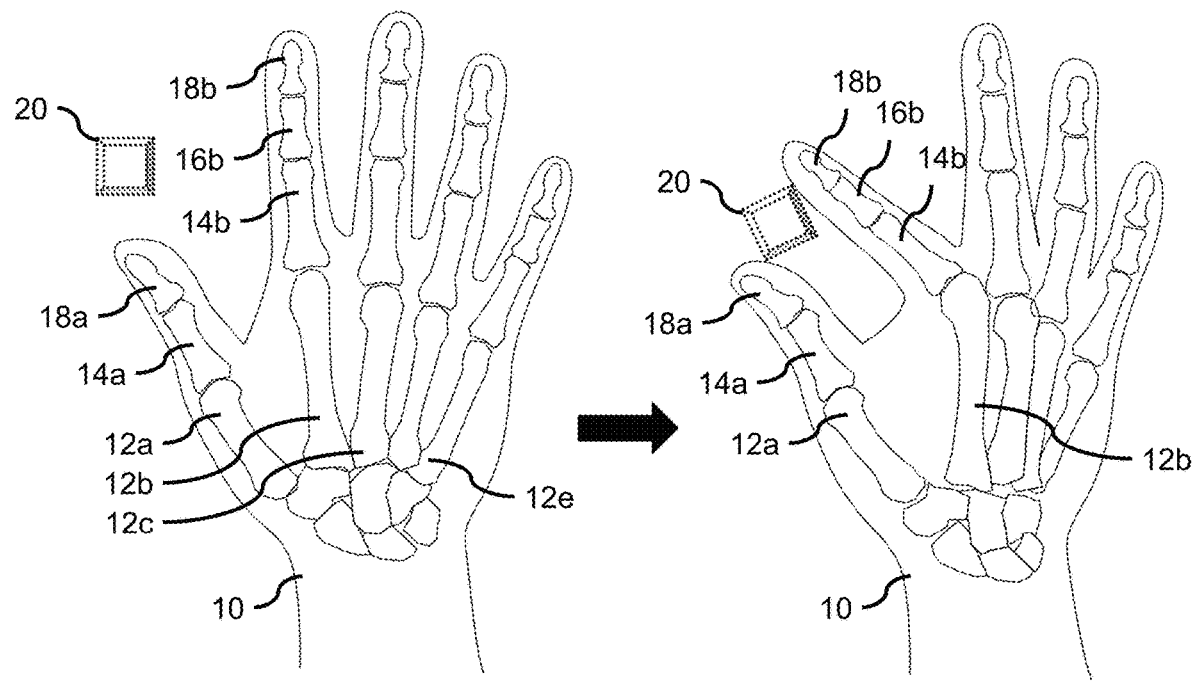

FIGS. 1A-1B show a hand 10 demonstrating a finger pose and a configuration of bones in the hand 10.

In FIG. 1A, the hand 10 changes from a first finger pose (left) to a second finger pose (right) that grasps an object 20 between a thumb 10a and an index finger 10b. Specifically, in the first finger pose, the thumb 10a, the index finger 10b, a middle finger 10c, a ring finger 10d, and a pinky finger 10e are extended and straight. In the second finger pose, the object 20 is disposed the tips of the thumb 10a and the index finger 10b which have rotated at their respective knuckle joints to secure the object 20.

In FIG. 1B, the various finger bones 12, 14, 16, 18 of the hand 10 are shown to illustrate how the finger pose is related to the relative position and orientation of the bones. As shown in the first finger pose (left), each digit of the hand 10 includes a metacarpal 12, proximal phalanx 14 connected to the metacarpal 12, and a distal phalanx 18 disposed at the end of each digit. With the exception of the thumb 10a, each finger 10b,c,d,e also has an intermediate phalanx 16 that connects the proximal phalanx 14 and the distal phalanx 18. In the second finger pose (right), the metacarpals 12a,b, the proximal phalanges 14a,b, the intermediate phalanx 16b, and the distal phalanges 18a,b moved in order to secure the object 20 at the tips of the thumb 10a and index finger 10b. As discussed above, based on detecting the relative movement and deflection of the metacarpals 12, it is possible to extrapolate finger pose information due to the musculature connecting metacarpals 12 to the various phalanges.

Figure 2A:
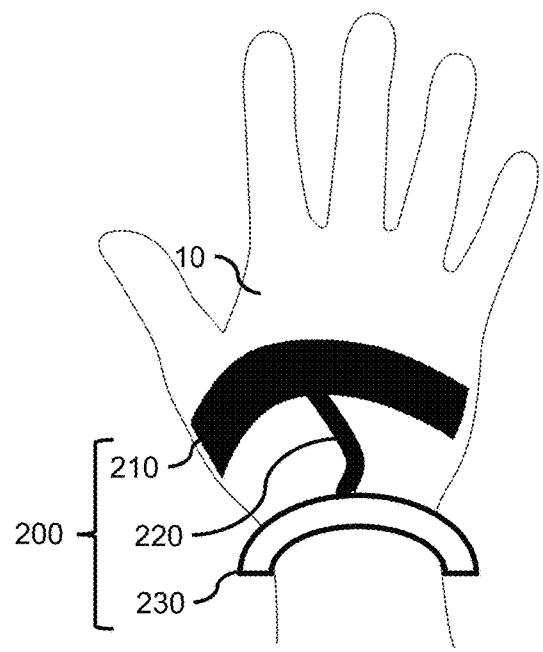
FIG. 2A-2B show an example of a finger tracking system in accordance with one or more embodiments of the invention.
Figure 2B:
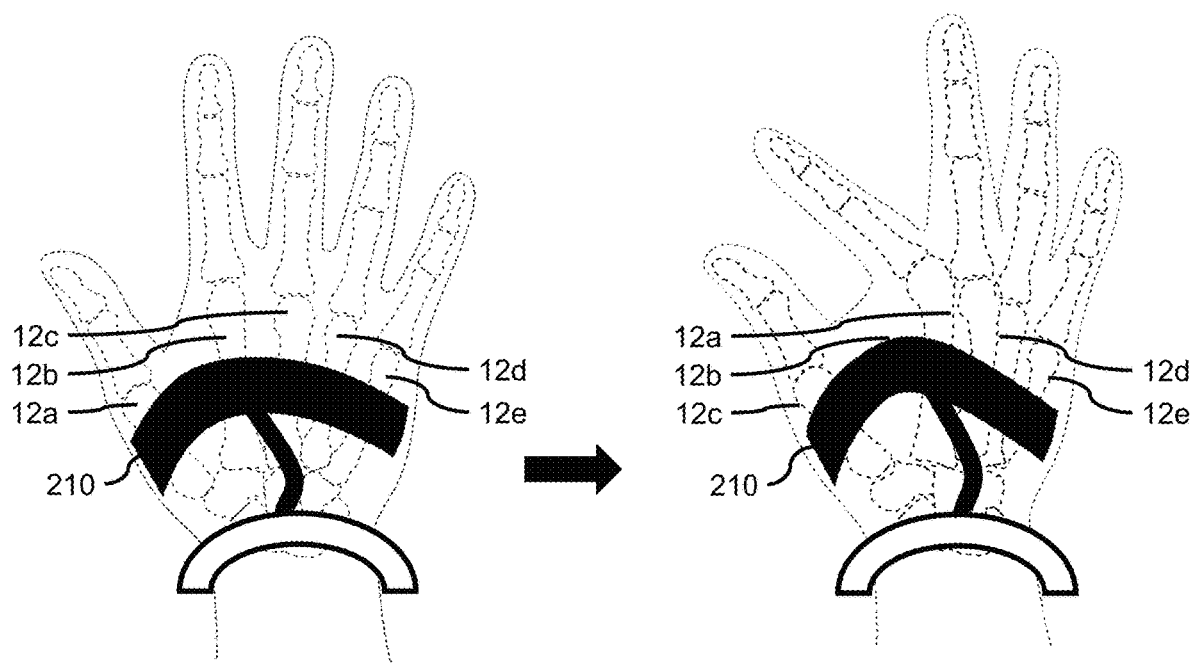

FIG. 2A-2B show an example of a finger tracking system 200 in accordance with one or more embodiments of the invention.

As shown in FIG. 2A, the system 200 includes a sensor patch 210 that attaches to the back of the hand 10 and communicates, via a connector patch 220, with a support band 230 that is a wearable wristband device equipped with a processor (e.g., a smart watch, a fitness tracker). Each of the components of the system 200 is described in further detail below. In one or more embodiments, the sensor patch 210, the connector patch 220, and/or the support band 230 may be combined into a single wearable patch device that tracks the fingers of the hand 10.

FIG. 2B shows the sensor patch 210 attached to the backside of the hand 10 in a region corresponding to the metacarpals 12a,b,c,d,e (i.e., the metacarpals 12) during the transition between the first finger pose and the second finger pose shown in FIG. 1B. To extrapolate finger pose information based on the metacarpals 12, the sensor patch 210 remains in conformal contact with the hand 10 and emits optical radiation into the hand 10 to track the movements of the metacarpals 12. The sensor patch 210 collects backscattered light intensities from the skin surface of the backside of the hand 10 and relays the data to the support band 230 that analyzes the data to determine finger pose information. The sensor patch 210 can be attached to the backside of the hand 10 for continuous monitoring (e.g., 24 hours/day, 7 days/week) of finger pose information or removed and replaced and the user's discretion (e.g., many on/off cycles) to provide finger pose information on demand.

Figure 3:
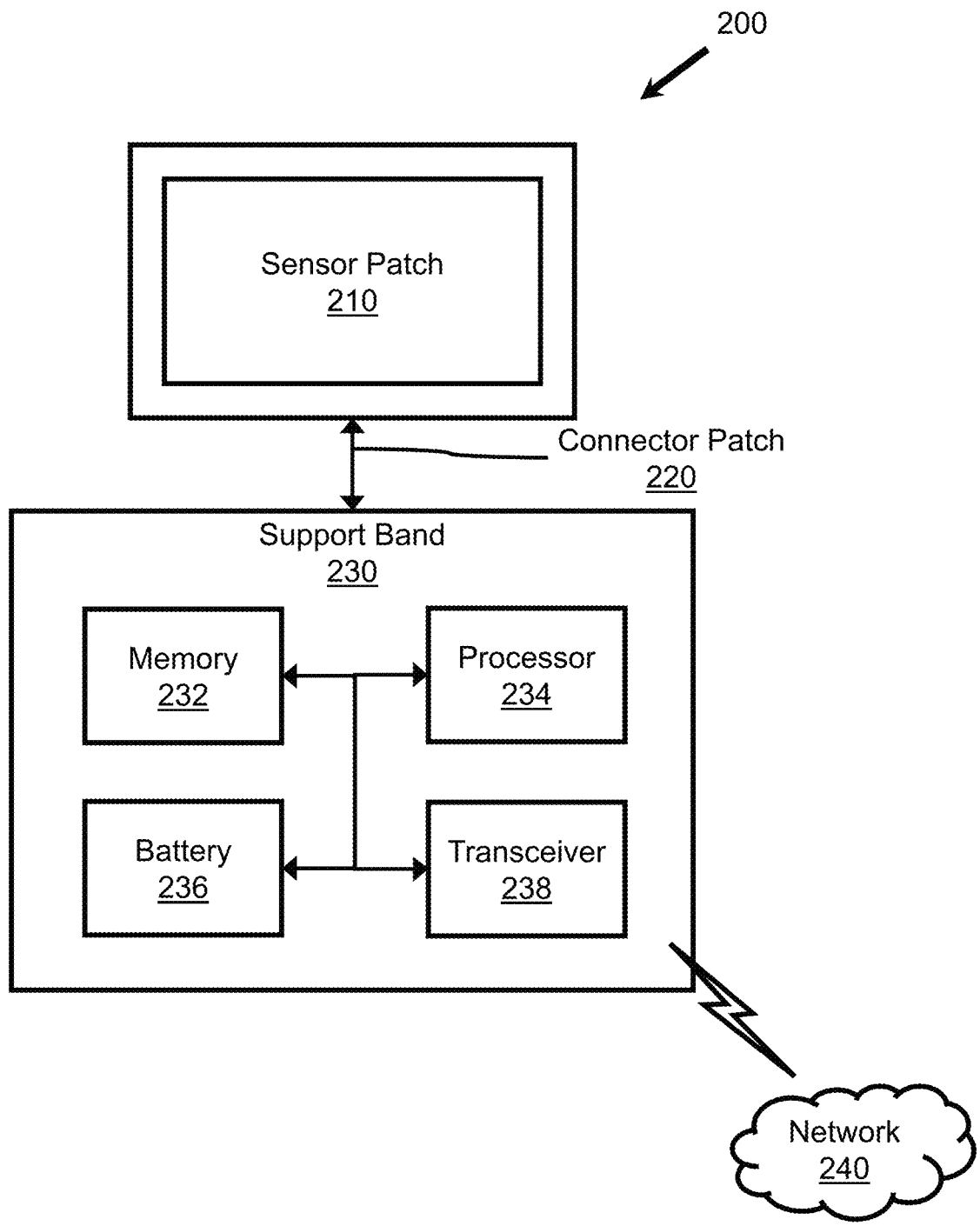
FIG. 3 shows a schematic of the finger tracking system in accordance with one or more embodiments of the invention.

FIG. 3 shows a schematic of the finger tracking system 200 in accordance with one or more embodiments of the invention. The system 200 has multiple components, and may include, for example, the sensor patch 210, the connector patch 220, and the support band 230.

The sensor patch 210 includes the optical components required to emit and collect the optical radiation used to detect movement of the metacarpals 12. The sensor patch 210 is described in further detail below with respect to FIG. 4.

The connector patch 220 includes connectors at each end of conductive wires to connect to the sensor patch 210 and the support band 230. The connectors may be an array of electrical contacts or an adapter (e.g., a plug or socket that can be attached/detached) to facilitate easy and fast connections to the sensor patch 210 and the support band 230. The conductive wires may be inkjet-printed conductive metallic lines or fine grade metal wires lines attached to an adhesive tape. The connector patch 220 may be flexible and configured to conform and/or adhere to the hand 10 to improved user comfort.

The support band 230 has multiple components, and may include, for example, a memory 232, a processor 234, a battery 236, and a transceiver 238. The memory 232 may be random access memory (RAM), cache memory, flash memory, or a storage drive that stores information for the sensor patch 210 and the support band 230. The processor 234 may be an integrated circuit (e.g., one or more cores, or micro-cores) for processing instructions for the sensor patch 210 and the support band 230. The battery 236 may be a rechargeable battery (e.g., lithium-ion or any other appropriate medium, 3V, 5V, or any appropriate low voltage level for operating the other components) for powering the sensor patch 210 and the support band 230. The transceiver 238 may be a wired or wireless communications circuit (e.g., data port, antenna(s) array, communications bus) that allows the system 200 to communicate with an external device, such as a user device or a network 240. Although the support band 230 in FIG. 3 is shown as having four components (232, 234, 236, and 238), in other embodiments of the invention, the support band 230 may have more or fewer components. Furthermore, the functionality of each component described above may be shared among multiple components or performed by a different component. For example, each component (232, 234, 236, and 238) may be utilized multiple times in serial or parallel to carry out repeated, iterative, or parallel operations.

The system 200 may also include one or more input device(s) (not shown), such as a button, touchscreen, camera, microphone, or any other type of input device for the user to provide information directly to the system 200 rather than through the transceiver 238. Further, the system 200 may include one or more output device(s) (not shown), such as a screen (e.g., a liquid crystal display (LCD), light emitting diode (LED) display, organic light emitting diode (OLED) display, or any other display device to provide information directly to the user rather than through the transceiver 238. One or more of the output device(s) may be the same or different from the input device(s). The system 200 may connect to a network 240 (e.g., a local area network (LAN), a wide area network (WAN) such as the Internet, mobile network, or any other type of network) via the transceiver 238 to exchange information between the system 200 and any external device.

Further, one or more processing elements of the support band 230 may be located at a remote location and may be connected to the other elements over the network 240. For example, one or more embodiments of the invention may be implemented by spreading the information processing across a distributed system having a plurality of nodes that include distinct computing and storage devices (i.e., cloud computing). Each node may correspond to a computer processor with associated physical memory. Each node may alternatively correspond to a computer processor or microcore of a computer processor with shared memory and/or resources.

Software instructions executed by the support band 230 may be in the form of computer readable program code to perform embodiments of the invention and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Figure 4:
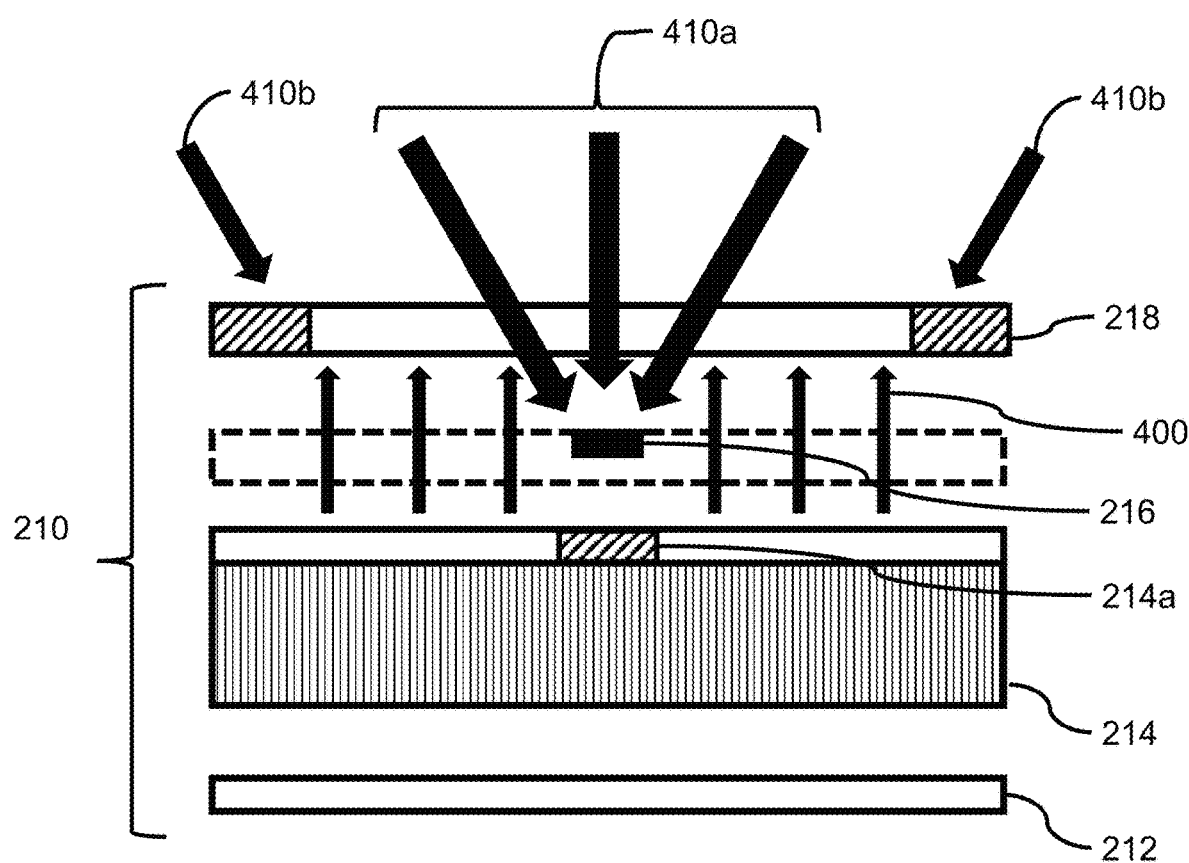
FIG. 4 shows a schematic of the sensor patch in accordance with one or more embodiments of the invention.

FIG. 4 shows a section of the sensor patch 210 in accordance with one or more embodiments of the invention. The drawings shown is not to scale and the dimensions of the component shown may be smaller or larger in any dimension.

The sensor patch 210 has multiple components, and may include, for example, a substrate 212, a light emitting layer 214, a photodiode 216, and a sectioning mask 218. Although the sensor patch 210 in FIG. 4 is shown as having four components (212, 214, 216, and 218), in other embodiments of the invention, the sensor patch 210 may have more or fewer components. Furthermore, the functionality of each component described below may be shared among multiple components or performed by a different component. For example, the sectioning mask 218 may be directly integrated into the structure of the photodiode 216. In addition, each component (212, 214, 216, and 218) may be utilized multiple times in serial or parallel to carry out a repeated operation or an iterative operation. For example, the sensor patch 210 may include a plurality of photodiodes 216 to track each finger of the hand 10. Each of the components of the sensor patch 210 is described in further detail below.

The substrate 212 is a flexible backer sheet that supports the other components of the sensor patch 210. In one or more embodiments, the substrate 212 may be a layer of single-sided adhesive tape (e.g., flexible medical-grade adhesive tape) that is configured to attach the sensor patch 210 to the backside of the hand 10 and conform the light emitting layer 214 to the backside of the hand 10. The characteristics of the flexible medical-grade adhesive tapes are: to be capable for the extended use with the maximizes comfort and designed specifically for use in electronic devices. The adhesive tape used in the substrate 212 may be any appropriate flexible medical-grade adhesive tape that permits the sensor patch 210 to be removed and reapplied to the hand 10 multiple times. In one or more embodiments, the adhesive portion of the substrate 212 may be replaceable. Alternatively, the entire sensor patch 210 and/or connector patch 220 may be disposable portions of the system 200. In one or more embodiments, the substrate 212 may include an elastic band or a flexible clamp that aids in keeping the entire sensor patch 210 applied to a surface of the hand 10.

The light emitting layer 214 is a flexible planar light source that controllably emits one or more wavelengths of light. For example, the light emitting layer 214 may be a flexible OLED sheet that can be used to emit one or more wavelengths in the visible (e.g., blue, green, red) and infrared (e.g., near-infrared, mid-infrared) range based on the absorption spectrum of the flesh on the hand 10. The OLED sheet may be a multilayer and/or multiwavelength LED design created by inkjet printing or any appropriate thin film fabrication process.

By using a planar light source (e.g., instead of point LED sources), a more uniform illumination profile is achieved and light detection errors in the photodiode caused by size differences of the hand and inhomogeneous locations of the metacarpal bones can be reduced or minimized. In one or more embodiments, the light emitting layer 214 may include several independent OLED sections to more precisely control the distribution of light emitted in the hand 10. Furthermore, the OLED sheet may include a shadow mask 214*a* that prevents scattered light from the backside of the photodiode 216 from reaching an adjacent photodiode 216 or other components of the sensor patch 210. As shown in FIG. 4, the light rays 400 emitted from the light emitting layer 214 do not impinge on the photodiode 216 due to the shadow mask 214*a*.

The light emitting layer 214 is controlled by the support band 230. For example, the light emitting layer 214 may be continuously powered or operated with a duty cycle of 50% or less (e.g., powered on-off in a cyclic manner to reduce overall power consumption, improve background measurement rate, filter out ambient contributions or baseline measurement shifts).

The photodiode 216 may be a single pixel detector configured to detect backscattered light intensities from the skin surface of the backside of the hand 10. Alternatively, the photodiode 216 may be a more complex photodetector (e.g., an multipixel array in one or more dimensions, a charge coupled device (CCD), may include one or more wavelength filters corresponding to the wavelength(s) of the light emitting layer 214). The photodiode 216 is pressed against the surface (any appropriate surface) of the hand 10 to detect changes in the optical properties of the surface of the hand 10 (e.g., backscattering and/or absorption of the OLED light) due to the movement one or more metacarpals 12 caused by the movement of the fingers 10*a,b,c,d,e*.

The photodiode 216 is connected to the support band 230. For example, the photodiode 216 may transmit signals to the support band 230 continuously, periodically, asynchronously, or on demand for processing and analysis. In one or more embodiments with a plurality of photodiodes 216 (e.g., a single photodiode 216 for each metacarpal 12 of the hand 10), the support band 230 may coordinate data from each photodiode 216 to determine finger pose information based on movements of multiple metacarpals 12.

The sectioning mask 218 is an opaque mask that blocks the transmission of light and prevents detection of stray light by the photodiode 216. The sectioning mask 218 is disposed between the photodiode 216 and the surface of the sensor patch 210 that contacts the hand 10. The sectioning mask 218 may form the surface of the sensor patch 210 that contacts the hand 10. The sectioning mask 218 may be a sheet with apertures corresponding to each photodiode 216 or one or more opaque masks disposed on a transparent film. In embodiments with multiple photodiodes 216 and a light emitting layer 214 that extends across the width of the hand 10, the sectioning mask 218 may prevent each photodiode 216 from detecting backscattered light from a region of the hand that corresponds to an adjacent photodiode. As shown in FIG. 4, the backscattered light rays 410a from the region directly in front of the photodiode 216 (e.g., from the corresponding metacarpal) are allowed to impinge on the photodiode 216 while the backscatter light rays 410b from the adjacent regions of the hand 10 are blocked.

Figure 5A:
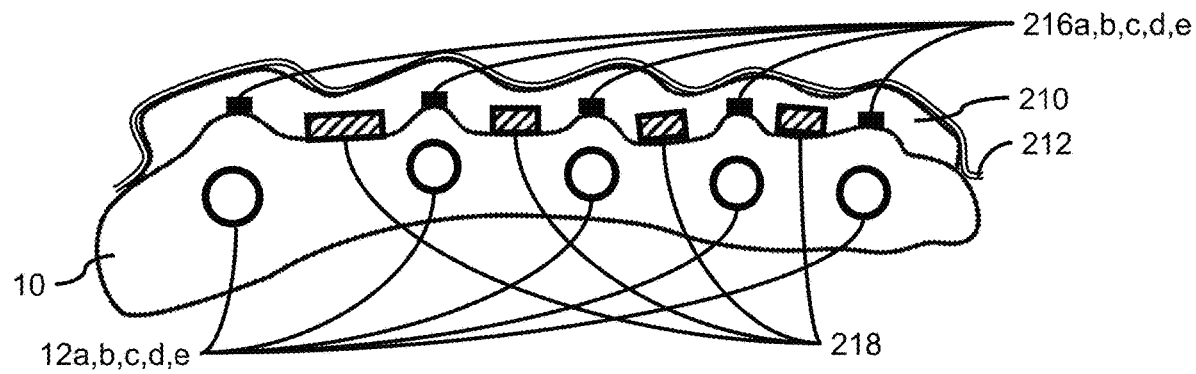
FIGS. 5A-5B show examples of a finger tracking system in accordance with one or more embodiments of the invention.
Figure 5B:
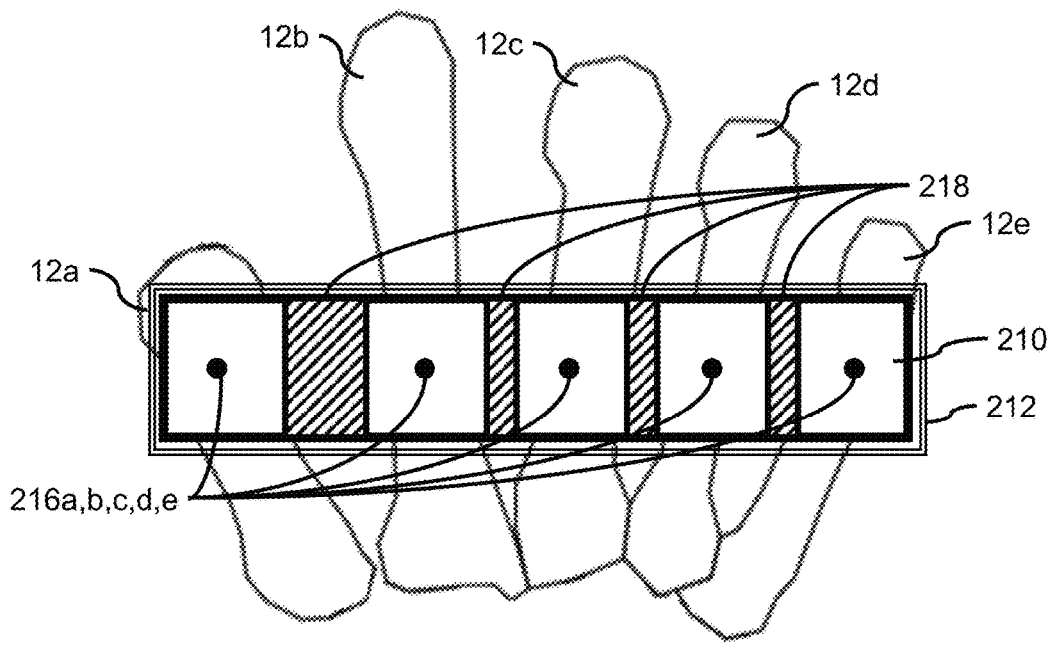

FIGS. 5A-5B show examples of a finger tracking system 200 in accordance with one or more embodiments of the invention.

In FIG. 5A, the sensor patch 210 is equipped with five photodiodes 216a,b,c,d,e that correspond to the five metacarpals 12a,b,c,d,e of the hand 10. The sensor patch 210 is equipped with a single continuous OLED sheet as the light emitting layer 214. The sensor patch 210 is equipped with a sectioning mask 218 that divides the emission regions of the OLED sheet into five regions that correspond to the five metacarpals 12a,b,c,d,e, of the hand 10. The sensor patch 210 is attached to the hand by a single-sided adhesive tape in the substrate 212. The size of the sensor patch 210 may be 10-20 cm long and 0.5-1.0 cm wide, and less than 1 mm thick. However, the dimensions of the sensor patch 210 are not limited to these ranges and any appropriate dimensions may be used to adequately position the light emitting layer 214 and the photodiodes 216 at positions to monitor bones within the hand 10.

As shown more clearly in FIG. 5B, the photodiodes 216a,b,c,d,e and are aligned with the five metacarpals 12a,b,c,d,e, of the hand 10. Accordingly, output signals from the five photodiodes 216a,b,c,d,e are processed by a processor (e.g., in the support band 230) and analyzed simultaneously. For example, the signals from the five photodiodes 216a,b,c,d,e may be analyzed by a pretrained pattern recognition machine learning model that determines the finger pose information (e.g., classification model based on predetermined finger actions or finger poses). The machine learning model is discussed in further detail with respect to FIG. 8.

Figure 6A:
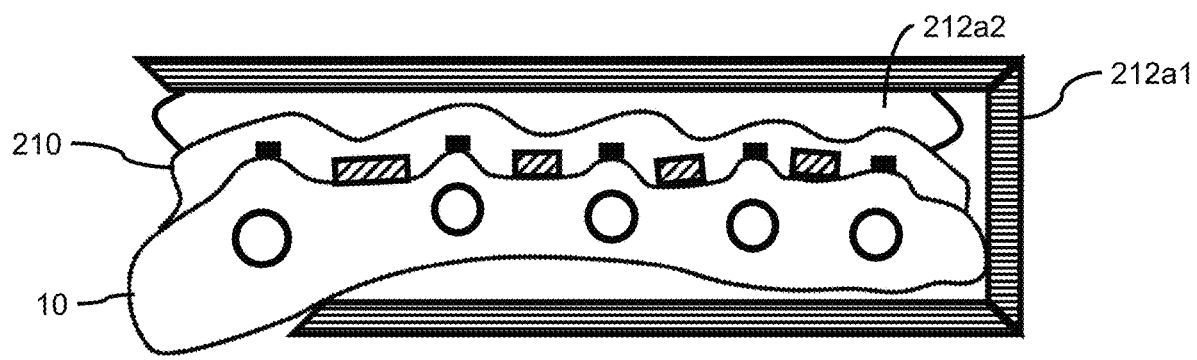
FIGS. 6A-6C show examples of a finger tracking system in accordance with one or more embodiments of the invention.
Figure 6B:
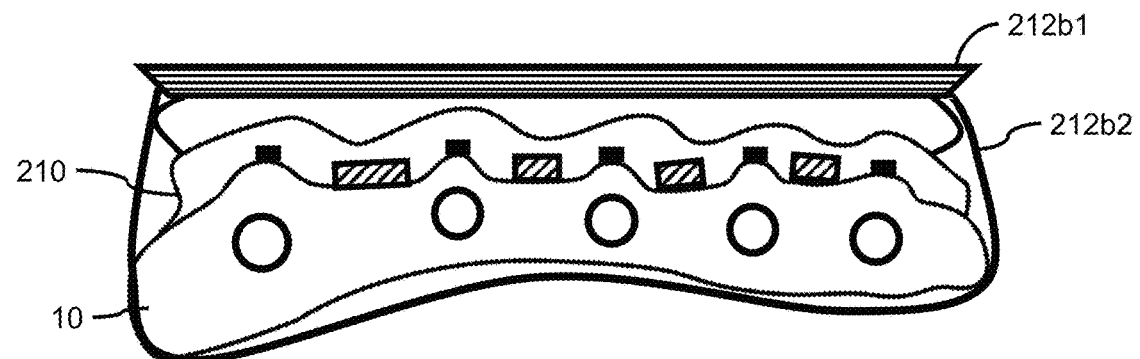
Figure 6C:
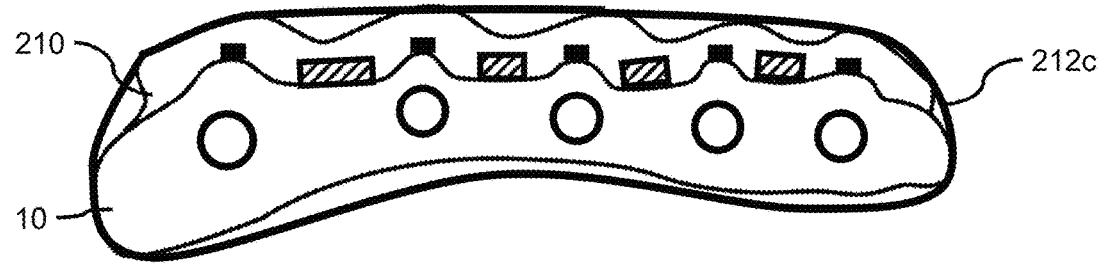

FIGS. 6A-6C show examples of finger tracking systems in accordance with one or more embodiments of the invention. In FIG. 6A, the substrate 212 of the sensor patch 210 includes a flexible clamp 212a1 and a conforming elastic layer 212a2 that presses the sensor patch 210 against the backside (top surface) of the hand 10. In FIG. 6B, the substrate 212 of the sensor patch 210 includes a rigid base plate 212b1 that is attached to an elastic band 212b2 that pulls the rigid base 212b1 and sensor patch 210 against the backside of the hand 10. In FIG. 6C, the substrate 212 of the sensor patch 210 is an elastic band 212c that pulls the sensor patch 210 against the backside of the hand 10. Increasing the contact pressure of the sensor patch 210 on the hand 10 may improve optical coupling (e.g., better transmission into the hand 10 and detection by the photodiode 216).

Figure 7:
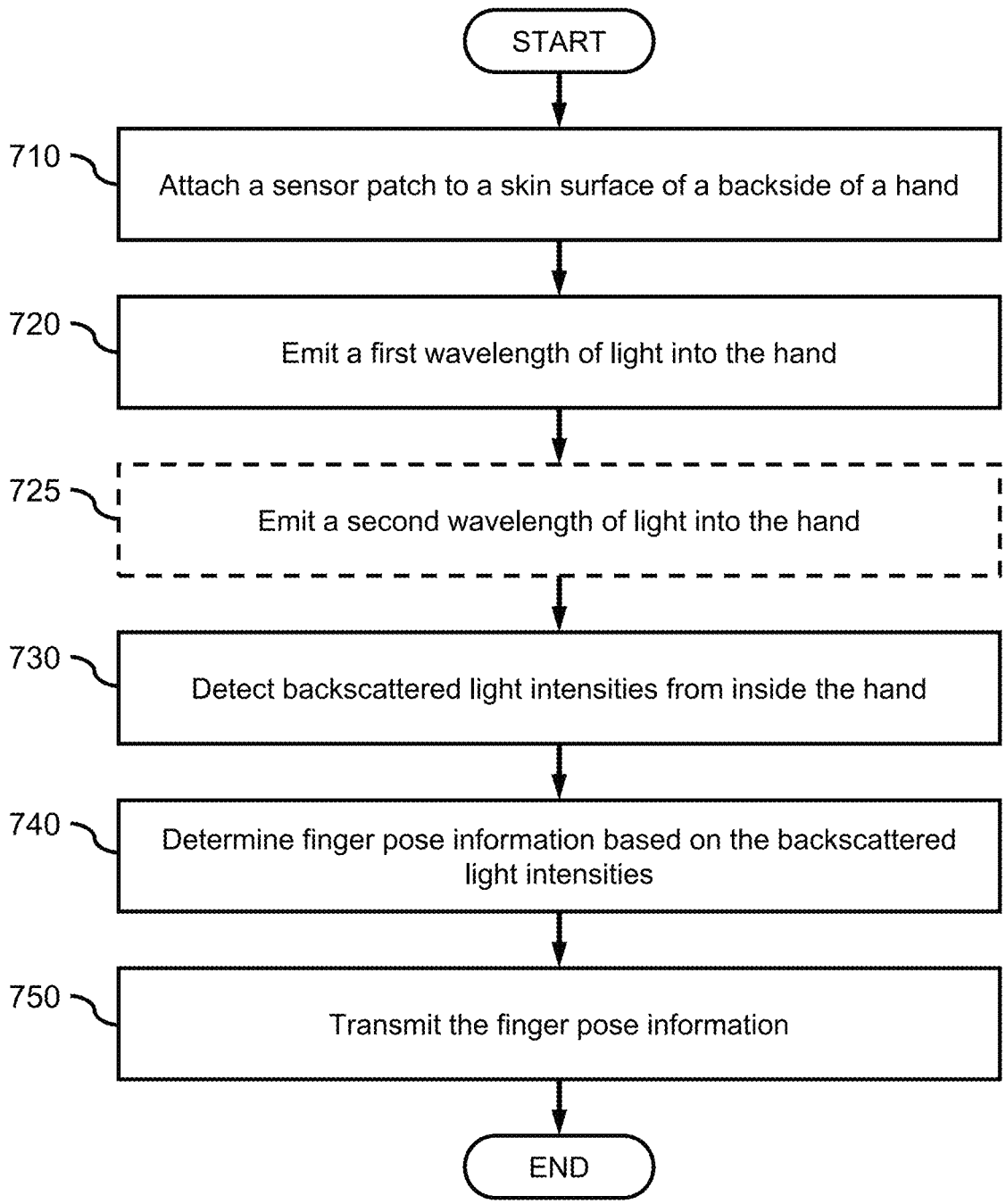
FIG. 7 shows a flowchart in accordance with one or more embodiments of the invention.

FIG. 7 shows a flowchart in accordance with one or more embodiments of the invention. One or more of the individual processes in FIG. 7 may be performed by the system 200 of FIG. 3, as described above. One or more of the individual processes shown in FIG. 7 may be omitted, repeated, and/or performed in a different order than the order shown in FIG. 7. Accordingly, the scope of the invention should not be limited by the specific arrangement as depicted in FIG. 7.

At 710, the sensor patch 210 is attached to a skin surface of a backside of a hand 10. The relatively thin layer of flesh between the skin and metacarpals 12 on the backside of the hand 10 allows for a direct correlation between the backscattered light intensities from the skin surface of the backside of the hand 10 and the movement of the metacarpal bones 12. Alternatively, the sensor patch 210 may be long enough or wide enough to extend around other portions of the hand 10 or to any other appropriate region of the hand 10 to obtain backscattered light intensities from any bones of the hand 10. The substrate 212 of the sensor patch 210 may be flexible to allow the light emitting layer 214 to conform to the backside of the hand 10.

In one or more embodiments, the sensor patch 210 includes a plurality of photodiodes 216 and the sensor patch 210 is disposed such that the plurality of photodiodes 216 are aligned at positions that correspond to the metacarpals 12 of the hand 10.

At 720, the light emitting layer 214 emits a first wavelength of light into the hand 10. The first wavelength of light may be any wavelength that penetrates the skin and flesh of the hand 10. In one or more embodiments, the first wavelength of light may be in the visible regime (e.g., 400-700 nm) or in the infrared regime (e.g., >700 nm).

In one or more embodiments, at 725, the light emitting layer 214 emits a second wavelength of light into the hand 10. The second wavelength of light may be any wavelength that penetrates the skin and flesh of the hand 10. In one or more embodiments, the second wavelength of light may be in the visible regime (e.g., 400-700 nm) or in the infrared regime (e.g., >700 nm). The first wavelength of light and the second wavelength of light are different wavelength to allow for more complex analysis. The first wavelength of light and the second wavelength of light may be emitted at different times. In one or more embodiments, each of the wavelengths of light may be emitted with a duty cycle of 50% or less.

In one or more embodiments, the light emitting layer 214 may emit any number of wavelengths of light to preform multiple different measurements (e.g., bone tracking, vital sensing) sequentially or simultaneously. For example, oxygenated blood and deoxygenated blood have absorption peaks at different wavelengths (e.g., 555 nm for deoxygenated hemoglobin, and 579 nm for oxygenated hemoglobin) and the relative difference in backscattered light intensities from the two wavelengths can be used to monitor the user's vital health signals (e.g., pulse, blood oxygen level, breathing rate).

In one or more embodiments, at 720 and/or 725, the first and/or second wavelength of light emitted by the light emitting layer 214 is prevented from backscattering off of the photodiode 216 by a shadow mask 214a.

At 730, the photodiode 216 detects backscattered light intensities from the skin surface of the backside of the hand 10. Detecting of the backscattered light intensities from the skin surface of the hand 10 may include spatially filtering the backscattered light a sectioning mask 218. The sectioning mask 218 prevents detection of stray light by the photodiode 216. For example, the sectioning mask 218 may be shaped and disposed to surround each of a plurality of photodiodes 216. In the example shown in FIGS. 5A-5B, light backscattered from the skin surface above the metacarpal 12c, which is primarily monitored by photodiode 216c, is prevented from impinging on photodiodes 12b,d by the sectioning mask 218.

At 740, a processor determines finger pose information by analyzing the detected backscattered light intensities from the photodiode 216. In one or more embodiments, the detected backscattered light intensities are communicated from the photodiode 216 to a support band 230 (e.g., a wearable wristband device such a smart watch or a fitness tracker) that includes the processor 234. The output signals from the one or more photodiodes 216 may be signal processed (e.g., filtering, amplifying, smoothing, etc.) and then analyzed simultaneously by a pretrained pattern recognition machine learning model, which is discussed in further detail below with respect to FIG. 8. The machine learning model may identify finger orientations or classify the output signals into various finger actions as the finger pose information. Some examples of the classification may include picking up a soft object; picking up a hard object; typing on a keyboard, typing on a personal device (e.g., smart phone); holding a handle (e.g., a racket/rod/club/bike handle for a sport activity); holding a tool (e.g., a tool handle/grip). The accuracy of the finger pose information may be increased due to the simultaneously monitoring and associating the output signals that are caused by the movements of multiple metacarpals 12.

At 750, the finger pose information is transmitted from the system 200 to an external device (e.g., a smart phone, a computer, a network, etc.). In one or more embodiments, the finger pose information is transmitted by a transceiver 238 in the support band 230. The transceiver 238 may use wired or wireless communication protocols to transmit the finger pose information.

Figure 8:
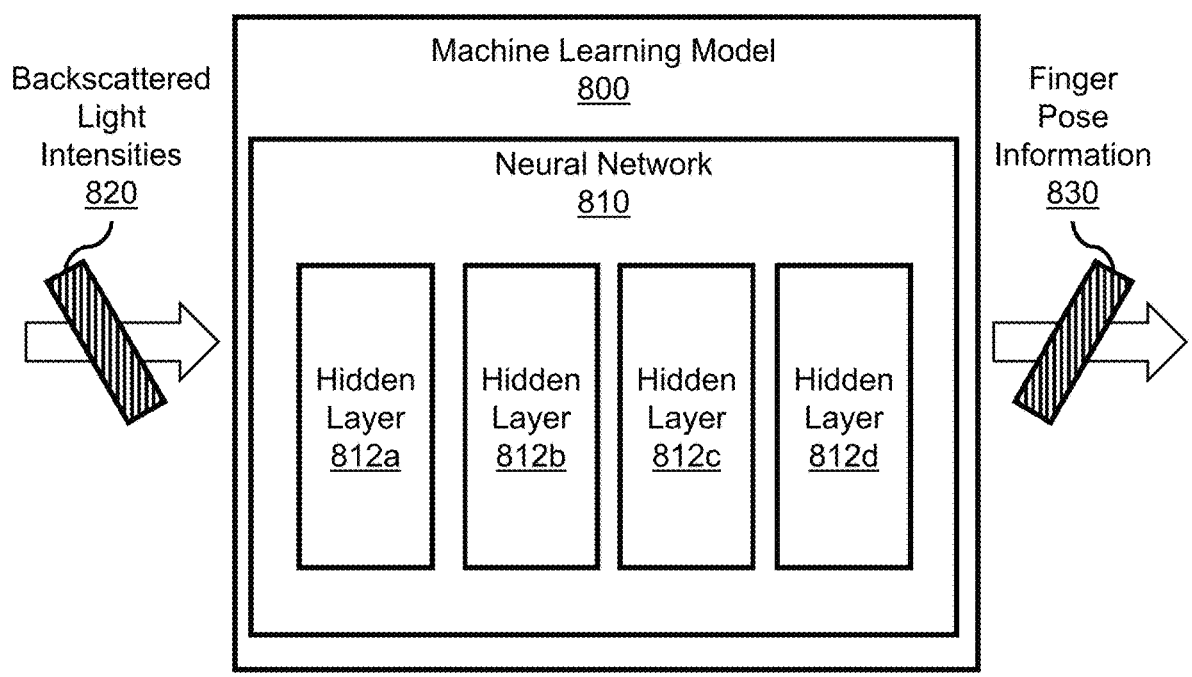
FIG. 8 shows implementation example in accordance with one or more embodiments of the invention.

FIG. 8 shows implementation example in accordance with one or more embodiments of the invention. In one or more embodiments, the system 200 uses a machine learning model that includes a deep learning neural network to determine the finger pose information. For example, one or more machine learning algorithms are used to train a machine learning model 800 to accept scattered light intensity 820 and output finger pose information 830. In some embodiments, real, synthetic, and/or augmented (e.g., curated or supplemented data) scattered light intensity data may be combined to produce a large amount of interpreted data for training the machine learning model 800.

The neural network 810 may be a deep learning neural network and may include one or more hidden layers 812a, b,c,d, where each hidden layer includes one or more modelling nodes (i.e., neurons). The neural network 810 may be pretrained by a labelled dataset and may be semi-supervised or unsupervised (e.g., such one one shot learning). Furthermore, the hidden layers 812a,b,c,d may include various hidden layer types (e.g., convolutional, pooling, filtering, down-sampling, up-sampling, layering, regression, dropout, etc.). In some embodiments, the number of hidden layers may be greater than or less than the four layers shown in FIG. 8. The hidden layers 812a,b,c,d can be arranged in any order.

Each neuron in the neural network 810 may combine one or more data points (e.g., from multiple photodiodes 216 from the input backscattered light intensities 820) and associate the data with a set of coefficients (i.e., weighted values within the neural network 810). Using the coefficients, the neurons amplify or reduce the value of the input data to assign an amount of significance of the input data. Through the training of the neural network 810, the neurons are trained to determine which data inputs should receive greater priority in determining one or more specified outputs (e.g., specific finger poses or finger action categories). The weighted inputs and outputs are communicated through the neurons and a neuron's activation function may pass connect neurons between one or more of the hidden layers 812a,b,c,d within the neural network 810. In other words, the activation function of each neuron may determine how the output of that neuron progresses to other neurons and hidden layers 812 before a final output is determined.

For example, the input data 820 may be convolved with pre-learned filters that are designed to highlight specific characteristics. In one or more embodiments, training data is directly obtained by emitting the first wavelength of light into the hand and detecting the backscattered light intensities during known finger poses (i.e., an initial calibration by the user). In one or more embodiments, the user's training data is supplemented by previously obtained real, synthetic, and/or augmented data. Using the available data, a machine learning algorithm trains the machine learning model 800 and deep learning neural network 810 to accept the input backscattered light intensities 820 and output the finger pose information 830.

The above example is for explanatory purposes only and not intended to limit the scope of how the backscattered light intensities 820 are analyzed to produce finger pose information 830. While FIG. 8 shows an example configuration, other machine learning configurations may be used without departing from the scope of the disclosure. For example, one or more of the individual components shown in FIG. 8 may be omitted, repeated, replaced with an appropriate alternative model different from what is shown in FIG. 8. Accordingly, the scope of the invention should not be limited by the specific configuration depicted in FIG. 8.

Embodiments of the invention may have one or more of the following advantages: reducing the size, bulkiness, heaviness, complexity, and intrusiveness of finger tracking systems compared to systems that utilize actuated gloves; improving the structural flexibility, comfort while wearing, comfort over usage duration, and adaptability of the form factor (e.g., flexible design and esthetics) of finger tracking systems; reducing manufacturing cost (low cost components), and manufacturing complexity (easy scale up, roll to roll, pick and place manufacturing); reducing hardware and computational resource requirements (i.e., less processing power, lower memory requirements, lower power requirements, lower communication bandwidth requirements) compared to computationally expensive machine vision systems; improving the ability to visualize and simulate a user's presence in a virtual environment.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A system for tracking fingers of a hand, the system comprising:
   a sensor patch comprising:
   a flexible substrate layer;
   a light emitting layer attached to the flexible substrate layer, wherein
   the light emitting layer is configured to conform to a skin surface of a backside of the hand and to emit a first wavelength of light; and
   a photodiode disposed between the light emitting layer and a surface of the sensor patch that contacts the hand; and a processor configured to:
  control emission of the first wavelength of light by the light emitting layer;
  analyze backscattered light intensities from the skin surface of the backside of the hand that are detected by the photodiode;
  determine finger pose information based on the backscattered light intensities; and
  transmit the finger pose information.

2. The system of claim 1, wherein
the sensor patch includes a plurality of photodiodes and a position of each photodiode correspond to a metacarpal bone of the hand.

3. The system of claim 2, wherein
the sensor patch further comprises a sectioning mask disposed between the photodiode and the surface of the sensor patch that contacts the hand, and
the sectioning mask prevents detection of stray light by the photodiode.

4. The system of claim 1, wherein
the light emitting layer is an organic light emitting diode sheet configured to operate with a continuous mode or a duty cycle of 50% or less.

5. The system of claim 4, wherein
the organic light emitting diode sheet is configured to emit the first wavelength of light and a second wavelength of light at different times,
the photodiode is configured to detect the first wavelength of light and the second wavelength of light.

6. The system of claim 4, wherein
the organic light emitting diode sheet comprises a shadow mask that corresponds to a position of the photodiode, and
the shadow mask prevents light emitted by the adjacent light emitting layer reaching to the photodiode.

7. The system of claim 1, wherein
the flexible substrate layer includes a single-sided medical-grade adhesive tape that is configured to attach the sensor patch to the backside of the hand and conform the light emitting layer to the backside of the hand.

8. The system of claim 1, wherein
the flexible substrate layer includes an elastic band or a flexible clamp that is configured to attach the sensor patch to the backside of the hand and conform the light emitting layer to the backside of the hand.

9. The system of claim 1, further comprises
a connector patch electrically connects the sensor patch to a wearable wristband device, and
the wearable wristband device includes the processor and a transceiver for communicating with a user device.

10. A method for tracking fingers of a hand, the method comprising:
  attaching a sensor patch to a skin surface of a backside of the hand, wherein
    the sensor patch includes a flexible substrate layer, a light emitting layer attached to the flexible substrate layer, and a photodiode disposed between the light emitting layer and a surface of the sensor patch that contacts the hand, and
    the light emitting layer conforms to the backside of the hand;
  emitting, by the light emitting layer, a first wavelength of light into the hand;
  detecting backscattered light intensities from the skin surface of the backside of the hand with the photodiode;
  analyzing, by a processor that is coupled to the light emitting layer and the photodiode, the backscattered light intensities from the skin surface of the backside of the hand;
  determining, by the processor, finger pose information based on the backscattered light intensities; and
  transmitting the finger pose information.

11. The method of claim 10, wherein
the sensor patch includes a plurality of photodiodes, and
attaching the sensor patch includes aligning the plurality of photodiodes at positions that correspond to metacarpal bones of the hand.

12. The method of claim 10, wherein
the detecting of the backscattered light intensities from the skin surface of the backside of the hand includes spatially filtering the backscattered light intensities with a sectioning mask, and
the sectioning mask prevents detection of stray light by the photodiode.

13. The method of claim 10, wherein
the first wavelength of light is emitted by an organic light emitting diode sheet operating with a continuous mode or a duty cycle of 50% or less.

14. The method of claim 13, further includes
emitting, by the light emitting layer, a second wavelength of light into the hand, wherein
the first wavelength of light and the second wavelength of light are emitted at different times.

15. The method of claim 13, wherein
light emitted by the adjacent light emitting layer is prevented from reaching the photodiode by a shadow mask, and
the shadow mask is attached to the organic light emitting diode sheet at a position corresponding to the photodiode.

16. A non-transitory computer readable medium (CRM) storing computer readable program code for tracking fingers of a hand, the computer readable program code causes a processor to:
  control emission of a first wavelength of light into the hand by a sensor patch attached to a skin surface of a backside of the hand, wherein
    the sensor patch includes a flexible substrate layer, a light emitting layer attached to the flexible substrate layer, and a photodiode disposed between the light emitting layer and a surface of the sensor patch that contacts the hand, and
    the light emitting layer conforms to the backside of the hand;
  detect backscattered light intensities from the skin surface of the backside of the hand with the photodiode;
  analyze the backscattered light intensities from the skin surface of the backside of the hand;
  determine finger pose information based on the backscattered light intensities; and
  transmit the finger pose information.

17. The non-transitory CRM of claim 16, wherein
the computer readable program code causes the processor to control the emission of the first wavelength of light by operating an organic light emitting diode sheet with a continuous mode or duty cycle of 50% or less.

18. The non-transitory CRM of claim 17, wherein
the computer readable program code causes the processor to control emission of a second wavelength of light into the hand by the light emitting layer, wherein
the first wavelength of light and the second wavelength of light are emitted at different times.

19. The non-transitory CRM of claim 16, wherein in determining the finger pose information, the processor uses a machine learning model that includes a deep learning neural network.

20. The non-transitory CRM of claim 19, wherein the computer readable program code further causes the processor to:
obtain training data by emitting the first wavelength of light into the hand and detecting the backscattered light intensities during known finger poses;
use a machine learning algorithm to train the deep learning neural network with the training data and known finger poses as inputs.

\* \* \* \* \*